Patented Apr. 15, 1941

2,238,392

UNITED STATES PATENT OFFICE 2,238,392

BRONZE WELDING ELECTRODE

Milan A. Matush, Milwaukee, Wis., assignor to Ampco Metal, Inc., Milwaukee, Wis., a corporation of Wisconsin No Drawing. Application December 4, 1939, Serial No. 307,492

13 Claims. (Cl. 219—8)

This invention relates to bronze welding electrodes.

It has been known for some time that certain types of bronzes, which have considerable strength and hardness, are adapted for use in many places where corrosion from salt water and other media is severe, and also in places where resistance to wear is required. This is particularly so with the aluminum bronzes.

However, due to the cost of bronze as compared to that of steel, it will be desirable in many places to use the bronze as a coating element for steel articles. Attempts have been made heretofore to deposit suitable corrosion resistant and wear resistant bronzes onto the surfaces of steel articles to afford the desired protection. These attempts, however, have been generally unsuccessful due to a loss in strength and hardness of the coating material, or to its dilution with the steel, and consequent loss of its desired properties.

The object of the present invention is to provide a bronze welding electrode which will deposit on steel and iron, or other metal articles a surface of an aluminum bronze which has the characteristics of cast and wrought bronzes.

Another object is to provide a suitable covering for aluminum iron bronze electrodes which will maintain the desired composition of deposit from electrodes of standard composition.

Another object is to provide an aluminum bronze welding electrode which will produce a deposit not subject to surface cracking, and having a high degree of hardness as well as reasonable ductility.

The invention has been variously embodied.

In one case, an aluminum iron bronze known as Grade 16 Ampco, and containing approximately 86.2% copper, 10.2% aluminum, and 3.3% iron, was rolled into a rod of suitable length and approximately ⅛ of an inch in diameter. This rod was then dipped in a thick paste containing substantially equal quantities of cryolite and sodium fluoride, with an addition of suitable quantities of sodium silicate and water.

More specifically, the paste was made up from approximately 180 grams of cryolite and 180 grams of sodium fluoride mixed together, to which was added approximately 150 grams of sodium silicate of standard 30° Baumé together with about 80 grams of water. This composition for covering the rods can be varied considerably with the cryolite and sodium fluoride ranging from 0 to 360 parts in opposite proportion. It has been found preferable to maintain the mixture substantially with equal parts of the cryolite and sodium fluoride, since the flux produced by this composition has the desired melting temperature and is more favorable in its action with respect to the deposited metal than are other mixtures.

The rod coated as above was dried in an oven to accelerate the expelling of moisture from it, and then dipped a second and third time in the paste and dried each time. In some instances, rods have been dipped as many as four times, where larger quantities of flux are desired as in preventing undercutting in welding in grooves. In general, for gas welding rods, a single dip is sufficient; for carbon arc filler rods, two dips are applied; and for normal metallic arc welding, three dips.

The rod made as above in three dips and employed in metallic arc welding was found to deposit a surface layer of aluminum iron bronze on a steel plate without serious dilution of the deposit from the steel beneath, and without undesirable loss of aluminum iron constituents. The deposit had a hardness measuring in excess of 150 Brinell. Welds made with this rod between steel plates had a similar hardness, and a ductility measured in elongation in tension test specimens of about 14%, with an ultimate tensile strength of 76,000 lbs. per square inch. The steel was an S. A. E. 1020 steel and in several specimens it broke outside of the weld when tension tested. The hardness of the surface of the deposit was substantially that of a cast bronze of the same composition, and additional treatment was not necessary to bring out the desired properties in the deposit.

In making the deposit and welds above referred to, the arc voltage was kept at approximately 25 volts, and the current employed was approximately 225 amperes for the ⅛ inch rod. The melting point of the Ampco bronze being considerably lower than that of steel resulted in less melting of the steel surface, and consequently undesirable dilution was avoided.

Where higher grades of Ampco bronze were employed, as, for instance, a bronze containing approximately 83.1% copper, 12.4% aluminum, and 4.1% iron, the deposit was found to be correspondingly harder, and included what is known as the "Ampco phase," which produces normally a very hard surface. Heretofore, in all attempts to weld the higher grades of Ampco, it has not been found possible to obtain a deposit having the Ampco phase in it in the as welded condition. In obtaining this advantage of the invention, it is best to employ an electrode containing at least 8% of aluminum and 2% of iron, the balance being substantially of copper.

In making surface deposits on steel, it is preferable to deposit two layers, the first layer being deposited from an electrode which has no iron content, and the second layer being deposited from an electrode having the desired iron content for the surface deposit. The arc is controlled in the depositing of the first layer in a manner to obtain a penetration in the steel which will result in a dilution of the deposit by the iron in the desired amount, thereby compensating for the lack of iron in the electrode. The second layer is deposited to insure greater uniformity and accuracy of composition of the deposit at the surface.

The welding of aluminum bronzes has been thought heretofore to be similar to that of welding copper or copper alloys. The present invention is based upon the discovery that aluminum bronzes should be treated in welding, similar to aluminum, since the aluminum constituent has the greatest tendency to oxidize and thereby destroy the desired characteristics of the deposit. By employing a covering on the electrode which is suitable in fluxing out the aluminum oxide, and to some extent preventing its formation, the deposit is kept clean from aluminum oxide, and is maintained in its desired composition.

In some instances where greater rates of deposit, or higher currents are to be employed, it may be desirable to initially coat the rod with aluminum, prior to applying the covering. This will have the effect of supplying additional aluminum and preventing the loss of aluminum in the deposit. Instead of aluminum, other metals, such as nickel and chromium may be employed, since, in limited amounts these metals have a known equivalence to that of aluminum in bronzes, and may in certain instances, produce desirable characteristics in the deposit. It is also possible to add small quantities of ferro manganese to the coating material, thereby modifying the flux produced, and in some instances, adding a slight amount of manganese to the deposit. Similarly, ferro aluminum and other metallic materials may be added to the covering.

Various materials such as sodium chloride, fused borax powder, lithium carbonate or potassium chloride, and the like may be added, either singly or in combination, to the basic covering composition in amounts up to 25% of the total, to improve the flux formation.

It is found that the covering is fused by the arc and forms a thin layer of flux on the weld preventing oxidation and loss of constituents and too rapid cooling of the deposited weld metal.

The welding electrode is very satisfactory for the welding of two bronze pieces together, as well as for the deposit of bronze coatings on steel. Other bronzes than aluminum bronzes may also be utilized with the invention, either as the composition for the weldrod core or for the parts being welded, or both. When welding bronze pieces together, care should be taken to prevent excess penetration of the parts being welded. The electrodes are also very suitable for welding steel pieces together with bronze welding material, as for instance where corrosion resistant welds are desired.

The invention may have various embodiments within the scope of the accompanying claims.

The invention is hereby claimed as follows:

1. A bronze welding rod comprising a rod containing in excess of 8% of aluminum and 2% of iron, the balance being substantially of copper, and a covering on said rod containing principally fluorides, and a binder.

2. A bronze welding electrode comprising a rod containing in excess of 8% of aluminum and 2% of iron, the balance being substantially of copper, and a covering on said rod containing aluminum fluorides, and sodium silicate.

3. A bronze welding electrode comprising a rod containing in excess of 8% of aluminum and 2% of iron, the balance being substantially of copper, a metallic coating on said rod, and a flux covering applied on the outside of said metallic coating, the flux covering being of a composition suitable for the absorption of aluminum oxide in welding.

4. A bronze welding electrode comprising a rod containing in excess of 8% of aluminum and 2% of iron, the balance being substantially of copper, and a covering on said rod of a composition effecting the absorption of aluminum oxide by the flux during welding.

5. A composition for covering an aluminum bronze welding electrode comprising substantially equal parts of cryolite and sodium fluoride, and a binder of sodium silicate.

6. An aluminum bronze welding electrode with a covering containing fluorides and a binder.

7. An aluminum bronze welding electrode with a covering containing sodium fluoride, cryolite, and sodium silicate.

8. A bronze welding electrode with a covering containing sodium silicate and substantially equal parts of sodium fluoride and cryolite.

9. A bronze welding electrode comprising a central core of aluminum bronze and a covering which contains sodium silicate and substantially equal parts of sodium fluoride and cryolite.

10. A bronze welding rod comprising a bronze rod and a covering thereon of substantial thickness containing a fluoride, metallic aluminum and a binder.

11. A bronze welding rod comprising a bronze rod and a covering thereon of substantial thickness containing a fluoride and manganese, the latter preferably in the form of ferro-manganese, and a binder therefor.

12. A bronze welding rod comprising a bronze rod and a covering thereon containing a flouride and a metal of the group of aluminum, nickel, chromium and manganese, or an alloy thereof.

13. An aluminum bronze welding rod comprising a rod of aluminum bronze and a covering therefor of a composition effecting the absorption of aluminum oxide by the flux during welding.

MILAN A. MATUSH.